United States Patent [19]

Bockman

[11] Patent Number: 5,677,768

[45] Date of Patent: Oct. 14, 1997

[54] METHOD AND INTERFEROMETRIC APPARATUS FOR MEASURING CHANGES IN DISPLACEMENT OF AN OBJECT IN A ROTATING REFERENCE FRAME

[75] Inventor: John J. Bockman, Santa Clara, Calif.

[73] Assignee: Hewlett-Packard Company, Palo Alto, Calif.

[21] Appl. No.: 676,872

[22] Filed: Jul. 3, 1996

[51] Int. Cl.[6] .................................................... G01B 9/02
[52] U.S. Cl. .......................... 356/351; 356/349; 356/358
[58] Field of Search ...................................... 356/345, 358, 356/349, 351

[56] References Cited

U.S. PATENT DOCUMENTS

| | | | |
|---|---|---|---|
| 4,329,055 | 5/1982 | Schaefer et al. | 356/346 |
| 4,802,765 | 2/1989 | Young et al. | 356/351 |
| 5,457,529 | 10/1995 | Tank et al. | 356/345 |
| 5,583,638 | 12/1996 | Cutler | 356/358 |

FOREIGN PATENT DOCUMENTS

| | | |
|---|---|---|
| 2-22503 | 1/1990 | Japan . |
| 3-223607 | 10/1991 | Japan . |

OTHER PUBLICATIONS

Yao Li and George Eichman, "Multipass Counterrotating Wave–Plate Frequency Shifters For Heterodyne Interferometry," Nov. 1986, Optics Letters/vol. 11, No. 11, pp. 718–720.

M. P. Kothiyal and C. Delisle, "Optical Frequency Shifter for Heterodyne Interferometry Using Counterrotating Wave Plates," Aug. 1984, Optics Letters/vol. 9. No. 8, pp. 319–321.

Gary E. Sommargren, "Up/down Frequency Shifter for Optical Heterodyne Interferometry," Aug. 1975, Journal of the Optical Society of America, vol. 65, No. 8, pp. 960–961.

Robert Crane, "Interference Phase Measurement," Applied Optics/vol. 8, No. 3/Mar. 1969, pp. 538–542.

Jae Sun Yoon and Sang Soo Lee, "Multiple–Reflection Laser Doppler Interferometer," Applied Optics/vol. 24, No. 21/1 Nov. 1985, pp. 3429–3431.

R.N. Shagam and J.C. Wyant, "Optical Frequency Shifter for Heterodyne Interferometers Using Multiple Rotating Polarization Retarders," Applied Optics/vol. 17, No. 19/Oct. 1978, pp. 3034–3035.

*Primary Examiner*—Frank G. Font
*Assistant Examiner*—Robert Kim

[57] ABSTRACT

In the claimed invention for an improved AC type interferometric metrology apparatus, a change in position of an item disposed in a rotating reference frame is measured. The rotating reference frame accumulates a rotation angle over a time period with respect to a fixed reference frame. A quarter wave plate and an interferometer comprising a polarizing beam splitter, a reference path reflector, and a measurement path reflector are all mounted in the rotating reference frame. The measurement path reflector is mounted to item so that changes in its radial position along an axis orthogonal to the axis of rotation of the rotating reference system are measurable. In one preferred embodiment, the components in the fixed reference frame are a two-frequency laser light source, a stationary quarter wave plate, a receiver, for producing a measure signal containing information representing the change in optical path length between the measurement and reference paths of the rotating interferometer, the difference in the two frequencies of the beams from the laser source, and the rotation angle, and a signal processor. The signal processor receives the measure signal, a reference signal representing the difference frequency of the laser light source, and a signal from a rotary encoder containing information proportional to the rotation angle. The signal processor produces a signal representing the measurement of the change in position. In another embodiment, the rotary encoder is replaced by added optical components which automatically produce optical signals that contain information about the rotation angle and the difference in the two frequencies of the beams from the laser source.

98 Claims, 9 Drawing Sheets

METHOD AND INTERFEROMETRIC APPARATUS FOR MEASURING CHANGES IN DISPLACEMENT OF AN OBJECT IN A ROTATING REFERENCE FRAME

FIELD OF THE INVENTION

This invention relates to a method and apparatus for using an interferometer to make measurements of changes in the location of an object. More particularly, this invention is for making such measurements while that object is in a rotating reference frame.

BACKGROUND FOR THE INVENTION

There is a need for measuring a change in position of an object, such as its linear or angular displacement, when such object is disposed in a rotating frame of reference. For example, in a CNC machine where a work piece is held stationary in a fixed reference frame and a cutting tool is rotated by a spindle, it would be very desirable to measure the radial position of the cutting tool as it is rotating and being used to machine the work piece into a finished shape. In the prior art, it is known to measure indirectly the radial position of the tool by measuring in the fixed reference frame the position of the mechanical linkages which control the radial position of the cutting tool. However, the accuracies of making such indirect measurements are limited by such problems as Abbe offset, thermal expansion, hysteresis, and backlash in the mechanical linkages. In other words, the point of measurement of radial position is not at or close to the rotating tool. Instead, the radial position is inferred from the amount of movement of a measurement scale which is mounted on a portion of a draw bar mechanically linked and located outside of the rotating spindle at a significant distance from the cutting tool.

AC type interferometers capable of measuring changes in linear or angular position are well known in the prior art. A typical example is described in U.S. Pat. No. 3,458,259, to Bagley, et al, and assigned to Hewlett-Packard Company (HP), the same assignee as the present patent application. HP also sells commercial products such as the HP 5517A laser transducer system which embodies an interferometer for making various types of displacement measurements. The HP system generates an electrical signals containing information representing the displacement measurements. The electrical signals are available for application to subsequent circuitry and devices for purposes such as displaying the measurements or controlling movement of the object. It would be desirable to use that interferometric metrology system for making a direct measurement of the radial position of the tool as it is rotating. The interferometric optics are relatively small and could be mounted to rotate with the spindle and used for directly measuring the radial position of the tool. However, the conventional AC type interferometer metrology system will not function properly if only the interferometric optics were mounted to rotate with the spindle. It is conceptually possible to mount the laser light source, interferometric optics, and the receiver for responding the optical signals so that they all rotate with the spindle. But, for many reasons, that arrangement is not practical for most of the CNC machines. For example, there are space limitations, problems of getting power to the electrical components of the metrology system, and complications of obtaining electrical signals out of the rotating reference frame.

SUMMARY

The problems and limitations of the prior art are overcome by an invention made in accordance with the teachings of the present invention. A new and improved AC type interferometric metrology apparatus is used to measure the position of a tool held by a rotating spindle located in a rotating reference frame. In a preferred embodiment, the rotating reference frame spins about an axis of rotation of the spindle and that axis is normal to a radial axis where the tool is positioned. A conventional two frequency laser light source mounted in a fixed frame of reference transmits twin beams each having a frequency which is different from one another by a prescribed amount. The beams from the source are converted from beams that have linear and orthogonal polarization states with respect to one another into input beams having right and left circular polarization states. The input beams are then sent to a quarter wave plate mounted in the rotating reference frame and converted into beams which have linear and orthogonal polarization states that rotate with the rotating reference frame. Mounted in the rotating reference frame, an interferometer includes a reference path reflector, a measurement path reflector, and a polarizing beam splitter with its polarization axis aligned at forty-five (45) degrees to the fast axis of the quarter wave plate. This arrangement ensures that the polarizing beam splitter divides the two beams so that one beam having one frequency is transmitted along a reference path, parallel to the axis of rotation, to the reference path reflector. The beam splitter reflects the other beam with the other frequency along a path parallel to the radial axis, to the measurement path reflector, which is connected to the tool.

The beams returning respectively from the reference and measurement path reflectors are transmitted back through the polarizing beam splitter and the quarter wave plate. Having right and left circular polarizations, the two emerging beams from the quarter wave plate are then sent to a second quarter wave plate mounted in the fixed frame and thereafter converted into beams having linear and orthogonal polarization states with respect to one another. A receiver mounted in the fixed frame of reference responds to the returning beams after they pass through the second quarter wave plate for generating an intermediate measure signal. However, the intermediate measure signal includes an unwanted component because the quarter wave plate in the rotating frame of reference introduces in the light beams passing back and forth through it a frequency shift proportional to the angular rotation of the reference frame. A signal processor is coupled to receive the intermediate measure signal, a reference signal from the light source, and a special signal representing a measurement of the angular rotation of the rotating quarter wave plate. The signal processor operates to remove the unwanted component and produces a signal representing the measure of the change in radial position of the measurement reflector.

In one preferred embodiment of the present invention, the special signal is produced by a rotary encoder disposed for measuring the amount of angular rotation of the rotating reference frame. In an alternate embodiment, the rotary encoder is replaced with an optical arrangement. Briefly described, this alternate embodiment requires the use of a second pair of input beams having linear and orthogonal polarization states with respect to one another and polarization axes that rotate with the rotating reference frame. A specially modified interferometer is arranged so that the second pair of input beams are both sent through the interferometer and bypass the polarizing beam splitter. After being transmitted to and reflected by the reference path reflector, the second pair of beams are passed back through the interferometer (bypassing the beam splitter) and through the quarter wave plate mounted in the rotating reference frame. Thereafter, those beams are sent into the fixed reference frame and pass through the second quarter wave plate for emerging as a second pair of returning beams having linear and orthogonal polarization states with respect to one another. A second receiver mixes the second pair of returning beams and generates a second receiver signal. The second receiver signal is combined with the intermediate measure signal to produce directly the signal representing the measurement of the change in position of the measurement reflector.

DESCRIPTION OF THE PREFERRED EMBODIMENTS

Figure 1:
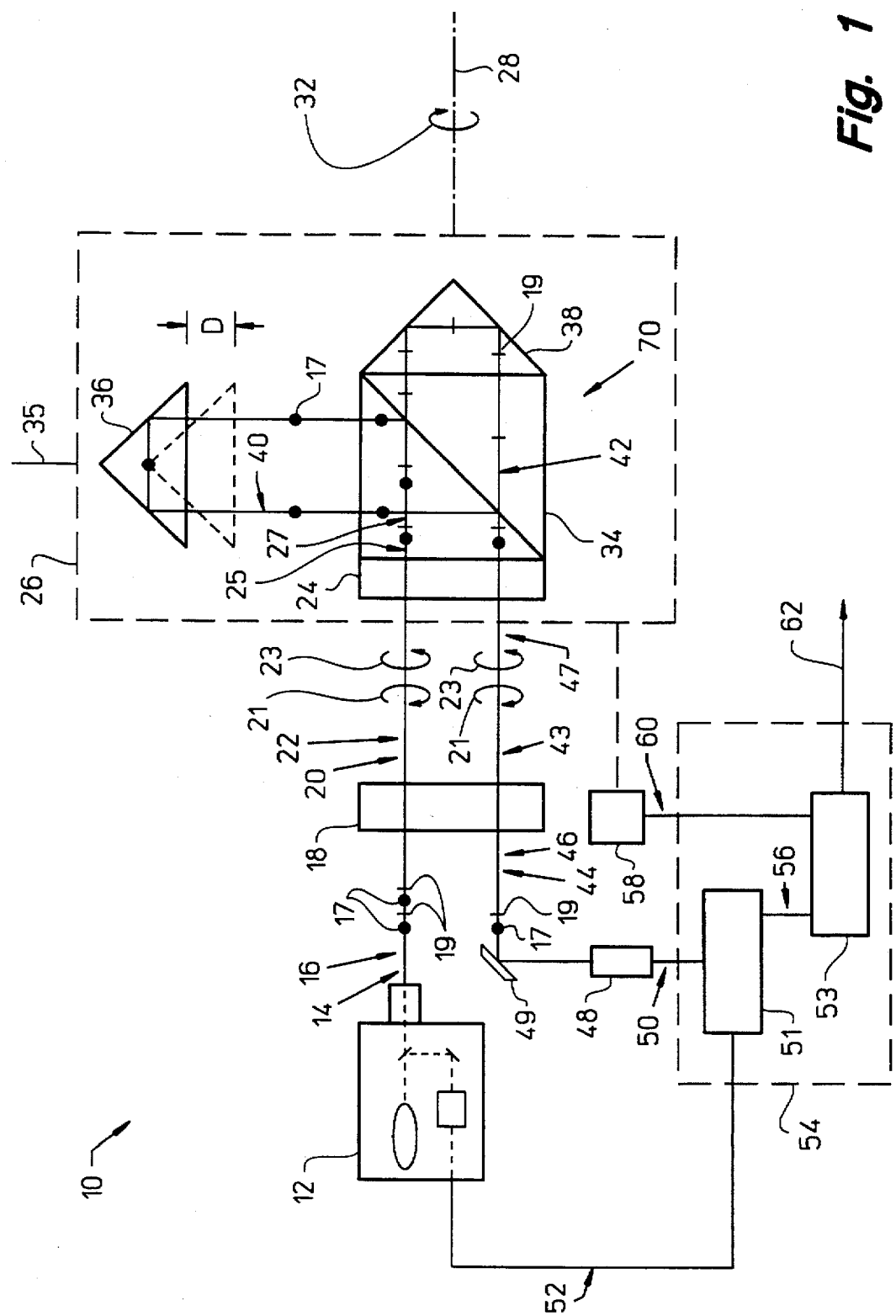
FIG. 1 is a schematic diagram of a preferred embodiment of the present invention.

FIG. 1 depicts a preferred embodiment of an interferometric apparatus 10 made in accordance with the teachings of the present invention. A laser head 12 is mounted in a fixed reference frame and generates twin coincident light beams 14 & 16 having stabilized frequencies f1 and f2, respectively. The two beams are produced so that one beam having frequency f1 is linearly and orthogonally polarized with respect to the other beam having frequency f2. For ease of explanation, the beam 14 is assumed to have frequency f1 in a plane of polarization which is normal to the plane of FIG. 1 and is depicted as dots 17. The beam 16 is assumed to have frequency f2 in an orthogonal plane of polarization which is in the plane of the FIG. 1 and is depicted as vertical lines 19. The twin light beams 14 & 16 are transmitted to a stationary quarter wave plate 18 which is mounted in the fixed reference frame and which converts the twin beams into beams 20 & 22 having right and left hand circular polarizations (depicted as circular arrows 21 & 23) with respect to one another. The twin beams 20 & 22 are then sent to a quarter wave plate 24 mounted in a rotating reference frame 26. The quarter wave plate 24 converts those twin beams to a pair of beams 25 & 27 which have linear and orthogonal polarization states with respect to one another. The rotating frame 26 revolves about a rotation axis 28. Since the quarter wave plate 24 is mounted in and thus rotates in unison with the rotating reference frame 26, the axes of linear polarization of the beams 25 & 27 also rotate with the rotating reference frame 26. For ease of explanation, the rotating reference frame is assumed to rotate with a rotational frequency of W revolutions/second, as indicated by a curved arrow 32, with respect to the stationary measurement frame where is mounted the light source 12. Since the beams 20 & 22 are produced with opposite circular polarizations, the resulting beams 25 & 27 emerging from the quarter wave plate 24 have their frequencies upshifted and downshifted respectively by an amount equal to W. It is also assumed for purposes of explanation that the beam 20 has frequency f1 and becomes the beam 25 having an upshifted frequency equal to f1+W. This arrangement also results in the beam 22 having frequency f2 which becomes the beam 27 having a downshifted frequency equal to f2−W.

A polarizing beam splitter 34 is mounted in and rotates with the rotating reference frame 26. The beam splitter 34 is disposed for receiving the twin beams 20 & 22 transmitted from the quarter wave plate 24. The fast axis of the quarter wave plate 24 is aligned to be 45 degrees to a polarization axis of the polarizing beam splitter 34. This arrangement permits the linear and orthogonal beams 25 & 27 to stay aligned to the polarizing beam splitter 34 as it rotates. The beam splitter 34 diverts the beam 25 with frequency f1+W upwards along a measurement path which is parallel to a radial axis 35, to a measurement reflector 36, which is preferably a conventional cube corner reflector. Although the measurement reflector 36 is movable back and forth along the radial axis 35, it is mounted in the rotating frame of reference 26 and thus rotates with respect the fixed reference frame. In the present description, the reflector 36 is assumed to have moved a distance D between the location where the reflector is depicted with solid lines and the location where the reflector is shown with dotted lines. The means for movably mounting the reflector 36 is not shown. The beam 25 after traveling out and back from the measurement reflector 36 returns to the beam splitter 34 as beam 40 with a Doppler shift of ±Δf. As is well known, the Doppler shift is positive or negative depending upon which frequency f1 or f2 is in the measurement path and the direction of movement of the measurement reflector 36.

The beam splitter 34 is arranged to pass beam 27 having frequency f2−W along a reference path having a fixed length to a reference reflector 38, which is also preferably a cube corner reflector. The reference path is parallel to the rotation axis 28 and the reflector 38 being mounted in the rotating reference frame 26 rotates about the rotation axis 28. The beam 27 after being reflected by the reflector 38 is returned to the beam splitter 34 as a beam 42. The beam 42 is not Doppler shifted.

The beam 40 is reflected by and the beam 42 is transmitted through the beam splitter 34 and both are then sent through the quarter wave plate 24 and become beams 43 & 47. Those beams are then passed through the stationary quarter wave plate 18 and emerge as returning beams 44 & 46, each of which is again frequency shifted up or down by a value equal to W. The beam 44 now has a frequency f1'=f1±Δf+2W and the beam 46 has frequency f2'=f2−2W. A receiver 48 mounted in the stationary measurement frame receives the beams 44 & 46 after they have been redirected by a beam bender 49 and operates to mix them for producing a measurement signal 50 having a frequency f_meas=f1'−f2'=f1−f2±Δf+4W. The terms of f_meas are the split frequency, f1−f2, the Doppler shift, ±Δf, arising from the movement of the measurement reflector 36, and the frequency shift, 4W, arising from the quarter wave plate 24 as it rotates in unison with the rotating reference frame 26. A reference signal 52 which is generated by the laser light source 12 has a frequency f_ref=f1−f2, the split frequency between beams 14 & 16. The measurement signal 50 and the reference signal 52 are transmitted to a compensator 54 which includes one portion 51 that operates by determining a frequency difference and integrating the result to produce an intermediate signal 56. The frequency difference, f_diff, is calculated by the following equation:

$$f_{13} \, diff = f\_meas - f\_ref = \pm \Delta f + 4W.$$

According to the Doppler effect, Δf=Fv/λ, where F is the interferometer fold factor, v is the velocity of the measurement reflector 36, and λ is the wavelength of the laser light beam. Integrating f_diff gives φ, which is the intermediate signal 56 and is the phase in fringes. In other words, $$\phi = \int f\_diff \, dt = F/\lambda \int v \, dt + 4 \int W \, dt = F/\lambda \cdot vt + 4Wt.$$

Since vt=D, where D is the distance moved by the reflector 36, then φ=DF/λ+4Wt. So if D=0, W=1 revolution/sec, and t=1 second, then φ=4 fringes/revolution of the rotating reference frame. Thus, in order to compensate for the frequency shift, occurring during the measurement of the change in displacement of the reflector 36 while the quarter wave plate 24 is rotating in unison with the rotating reference frame, a correction of 4 fringes/revolution of the rotating reference frame 26 is required to be subtracted. In the preferred embodiment, a conventional encoder 58 is coupled to the rotating reference frame 26 for detecting its angular rotation and generating an encoder signal 60.

A second portion 53 of the compensator 54 receives the intermediate signal 56 and the encoder signal 60 and responds to produce a displacement signal 62 representing the measurement of the change in position, D, of the reflector 36 along the radial axis 35.

As a result of the above arrangement, it can be understood that the present invention is adaptable for use in a CNC machine application where a spindle containing a radially movable cutting tool is rotating about the axis 28. By affixing the measurement reflector 36 to the slider holding the cutting tool and arranging the rotational axis 28 to be coincident with the axis of rotation of the spindle, the measurement of the displacement of the measurement reflector 36 is a direct measurement of the movement of the tool along a radial axis normal to the axis of rotation of the spindle.

Figure 2:
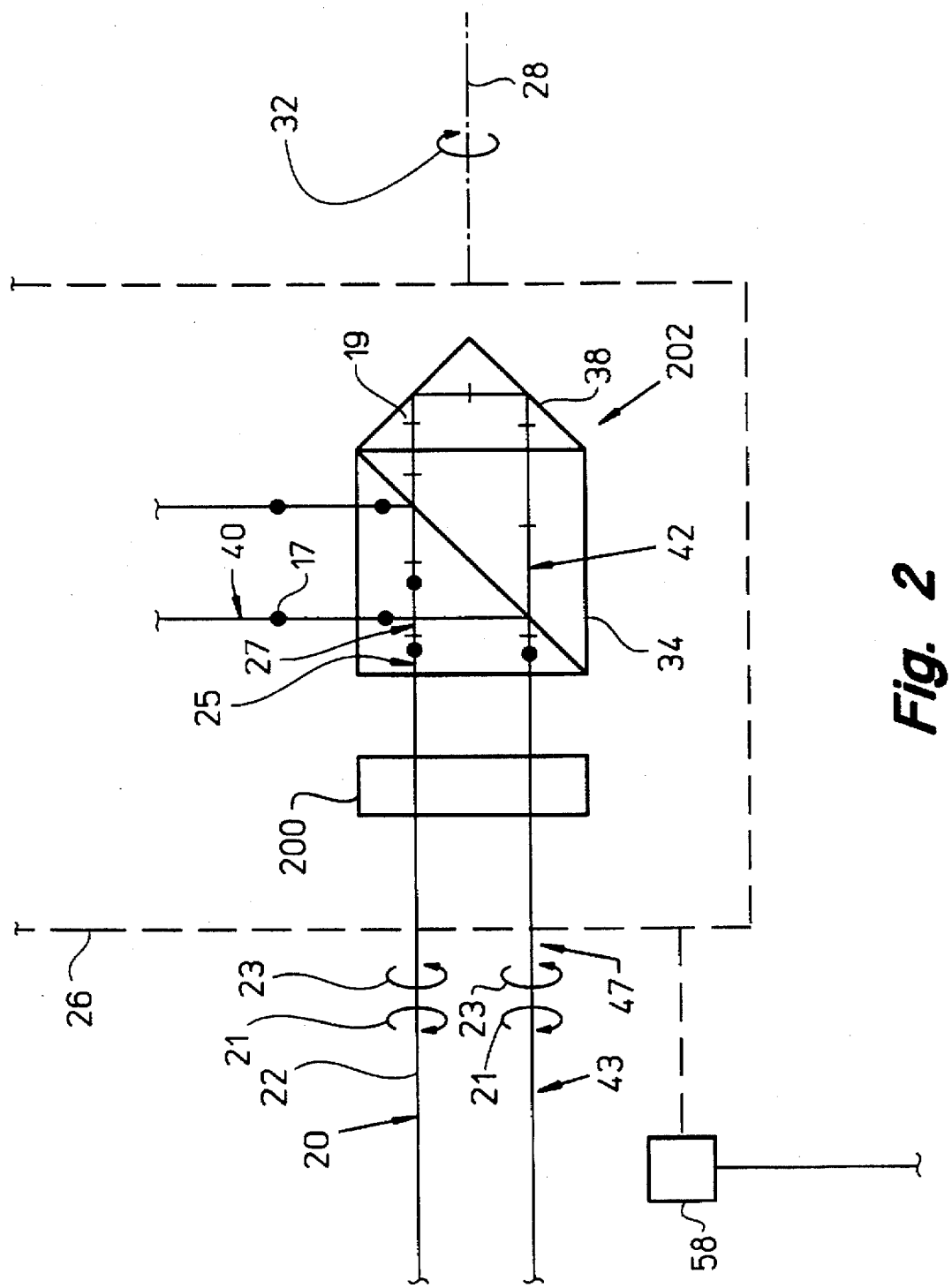
FIG. 2 is a partial view of an alternative embodiment of the present invention wherein a quarter wave plate is mounted in the rotating reference frame separated from the interferometer.

In the preferred embodiment shown in FIG. 1, the quarter wave plate 24 is preferably affixed to the polarizing beam splitter 34 of an interferometer 70. A partial view of an alternate embodiment is depicted in FIG. 2 in which a quarter wave plate 200 and interferometer 202 is used in place of the quarter wave plate 24 and interferometer 70 of FIG. 1. In this alternate embodiment, the quarter wave plate 200 is separated from the interferometer 202. The remaining elements of FIG. 2 (not shown) are the same as those in FIG. 1.

Figure 3:
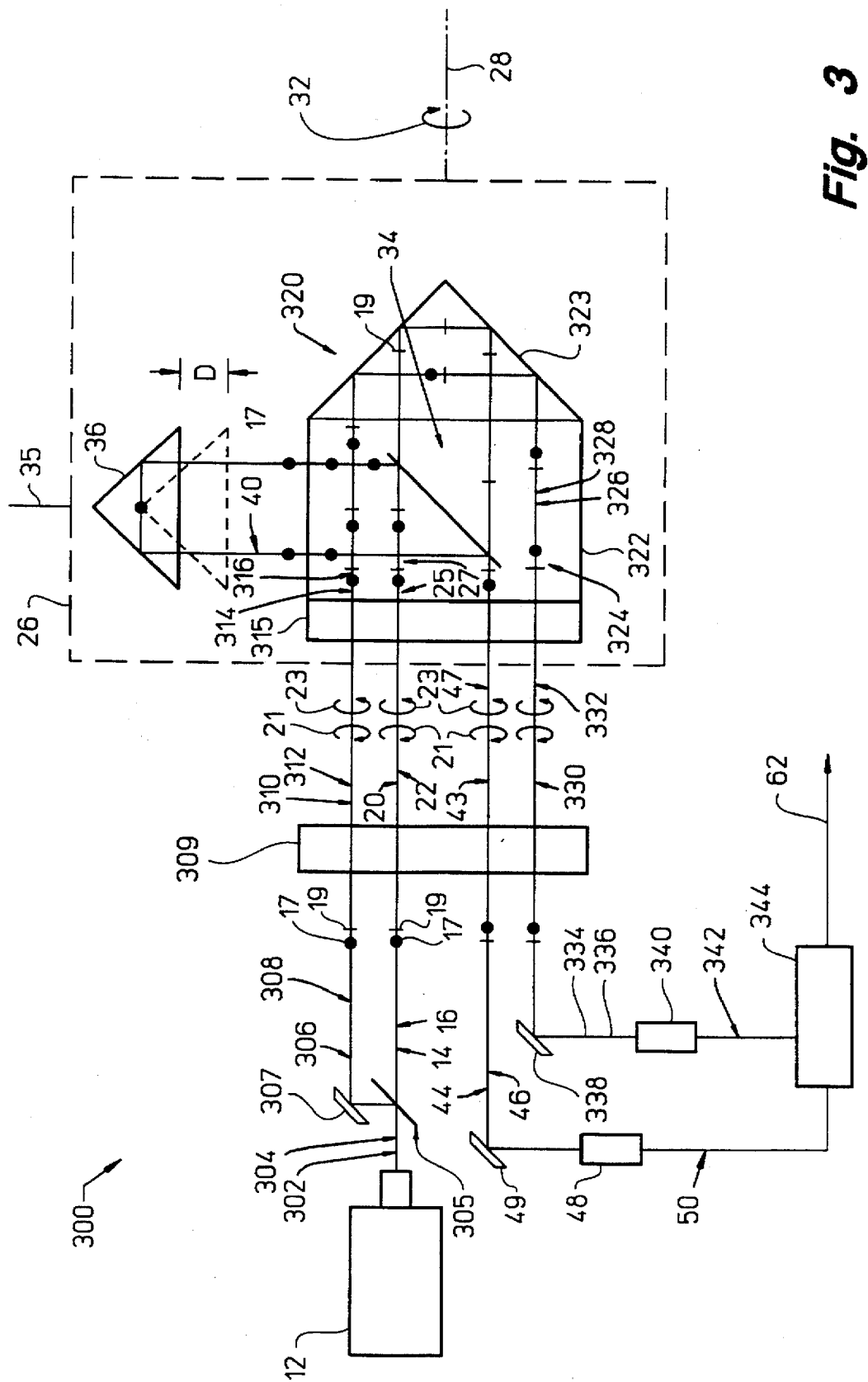
FIG. 3 is another preferred embodiment of the present invention wherein the frequency shift due to the rotation of a quarter wave plate is corrected via the use of optical beams.

Depicted in FIG. 3 is another preferred embodiment of the present invention. In an interferometric apparatus 300, the laser head 12 mounted in a fixed reference frame generates twin beams 302 & 304 having the frequencies f1 and f2, respectively, and linear and orthogonal polarizations. A non-polarizing beam splitter 305 divides the beams 302 & 304 into the beams 14 & 16 and another pair of beams 306 & 308 which emerge from a beam bender 307. The beams 14 & 16 have linear and orthogonal polarization states with respect to one another. The beams 306 & 308 also have linear and orthogonal polarization states with respect to one another as depicted by the dot 17 and the line 19. A stationary quarter wave plate 309 converts the beams 14 & 16 to the beams 20 & 22 having right and left circular polarizations with respect to one another. The beams 306 & 308 are also converted by the stationary quarter wave plate 309 into a pair of beams 310 & 312 having right and left circular polarization states with respect to one another. A quarter wave plate 315 mounted in the rotating reference frame 26 converts the beams 14 & 16 to the beams 25 & 27 having linear and orthogonal polarization states to one another. The beams 310 & 312 are also converted by the quarter wave plate 315 into a pair of beams 314 & 316 having linear and orthogonal polarization states to one another. An interferometer 320 mounted in the rotating reference frame includes the polarizing beam splitter 34 which is formed as a central core portion of a cube 322 and a reference reflector 323. The reflector 323 is preferably a cube corner reflector. The beam splitter 34, the measurement reflector 36, and all other elements having the same reference numerals as in FIG. 1 are all arranged and operated in the same manner as described for those same elements. Accordingly, the beams 44 & 46 are generated in the same manner as in the embodiment of FIG. 1 and are sent to the receiver 48 after being redirected by the beam bender 49. The receiver 48 generates the measurement signal 50.

The cube 322 includes an outer annular portion 324 which surrounds the polarizing beam splitter 34. The annular portion 324 transmits the beams 314 & 316 to the reference reflector 38 which reflects those two beams back into the annular portion 324 as a pair of beams 326 & 328. After being applied to the quarter wave plate 315, the beams 326 & 328 emerge as a pair of beams 330 & 332 having right and left circular polarization states to one another. The stationary quarter wave plate 309 thereafter converts the beams 330 & 332 to a pair of beams 334 & 336 having linear and orthogonal polarization states to one another. A beam bender 338 redirects the beams 334 & 336 to a reference receiver 340 which is mounted in the fixed reference frame and which operates to generate a reference signal 342. A compensator 344 operating in response to the applied measurement signal 50 and the reference signal 342 generates the displacement signal 62 representing the change in position of the reflector 36 along the radial axis 35. Accordingly, this embodiment as depicted in FIG. 3 eliminates the need for the encoder 58 as well as the signal 52 from the laser head 12 as shown in FIG. 1.

Figure 4:
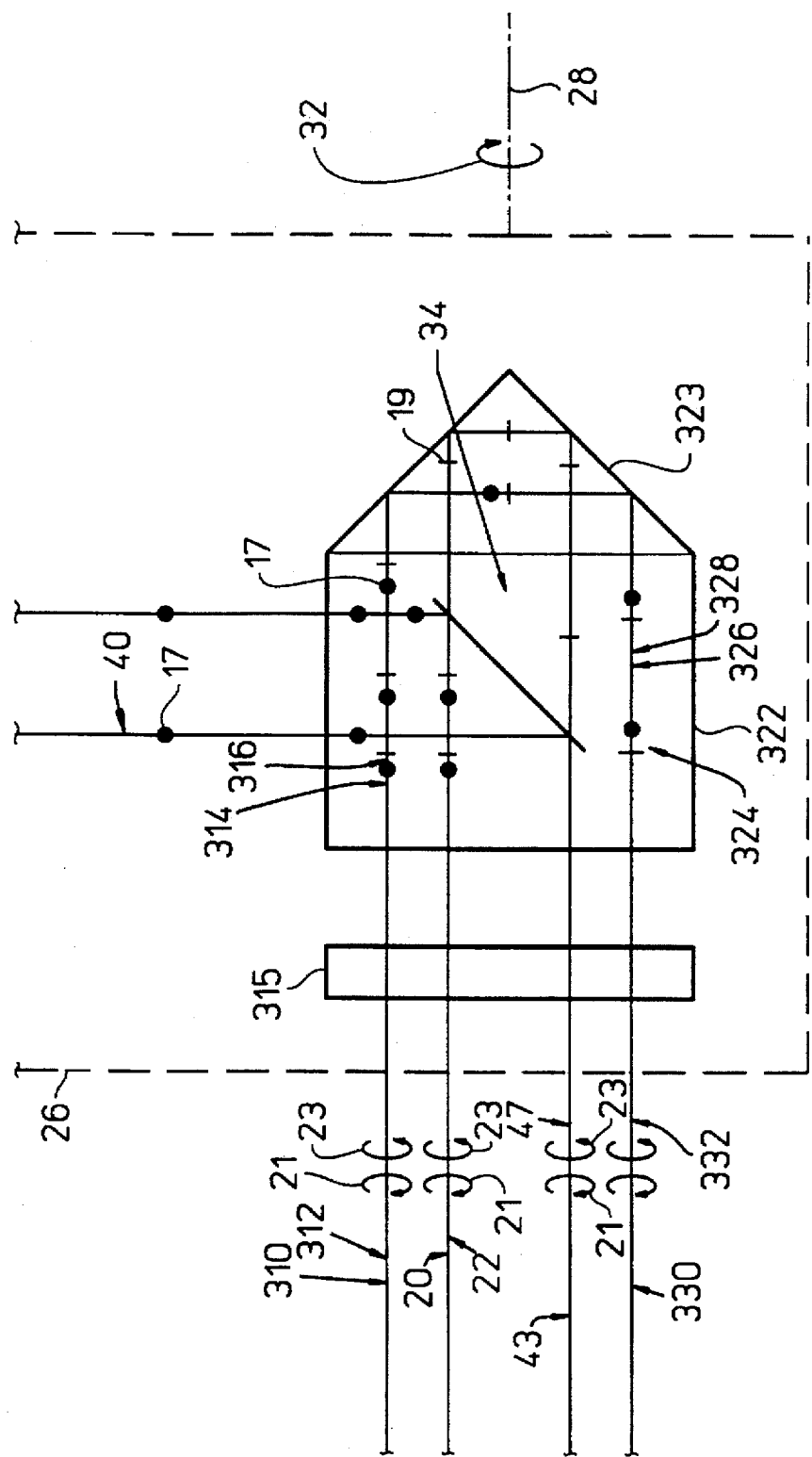
FIG. 4 is a partial view of another alternate embodiment of the present invention wherein a quarter wave plate is mounted in the rotating reference frame separated from the interferometer.

In the embodiment shown in FIG. 3, the quarter wave plate 315 is preferably affixed to the cube 322. FIG. 4 depicts a partial view of another embodiment of the present invention wherein the quarter wave plate 315 is separated from the cube 322. The other elements (not depicted) are the same as those in FIG. 3.

Figure 5:
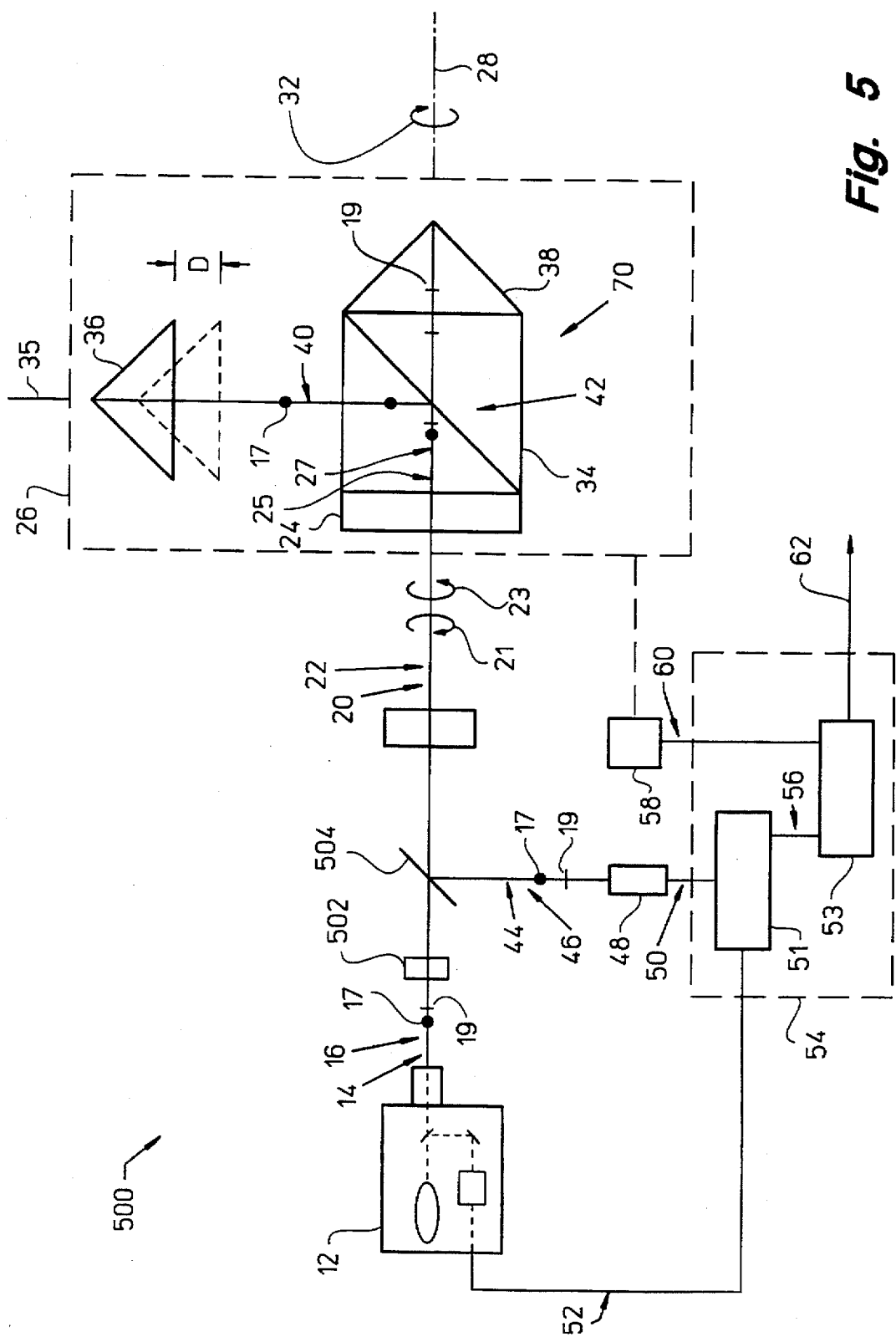
FIG. 5 is another alternate embodiment of the present invention wherein the optical beams are coaxial.

FIG. 5 shows another alternate embodiment of an apparatus 500 made in accordance with the teachings of the present invention. As in the prior embodiments, the laser head 12 mounted in the fixed reference frame produces the twin beams 14 & 16 which are transmitted through an isolator 502. The purpose of the isolator 502 will be explained in a later portion of this description. Next, the twin beams are passed through a non-polarizing beam splitter 504, the quarter wave plate 18 mounted in the fixed reference frame, and then to the quarter wave plate 24 mounted in the rotating reference frame 26. The twin beams 20 & 22 emerging from the quarter wave plate 18 have right and left circular polarizations with respect to one another. After emerging from the quarter wave plate 24, the twin beams 25 & 27 have linear and orthogonal polarization states but which now rotate with the rotating reference frame 26. The interferometer 70 operates the same as described in FIG. 1 so that the measurement reflector 36 returns the beam 40 and the reference reflector 38 returns the beam 42. The beams 40 & 42 after passing through the quarter wave plate 24 and the stationary quarter wave plate 18, are reflected by the non-polarizing beam splitter 504 and emerge as the beams 44 & 46 which are sent to the receiver 48. The purpose of the isolator 502 is to block or significantly attenuate any of the returning beams from being transmitted back into and adversely affecting the operation of the laser head 12. The technology for designing and making suitable optical isolators is known. Optical attenuators are all well known devices and many are suitable for use in the present invention. It should be pointed out that a disadvantage of using an attenuator is the resulting lower efficiencies due to lower beam intensities.

The other elements of FIG. 5 which have the same reference numerals as depicted in FIG. 1 operate in the same manner so that the apparatus 500 thereby produces the displacement signal 62. The apparatus 500 is very similar to the apparatus 10 (of FIG. 1), except that the beams entering and returning from the rotating reference frame 26 are coaxial in path instead of traveling along parallel paths. This embodiment is not preferred as that shown in FIG. 1 because the signal intensity of the beams is lower than used in apparatus 10. However, the interferometer 70 used in the apparatus 500 can be smaller than that for the apparatus 10, since the beams are coaxial. This embodiment is useful for those applications where space is very limited.

Figure 6:
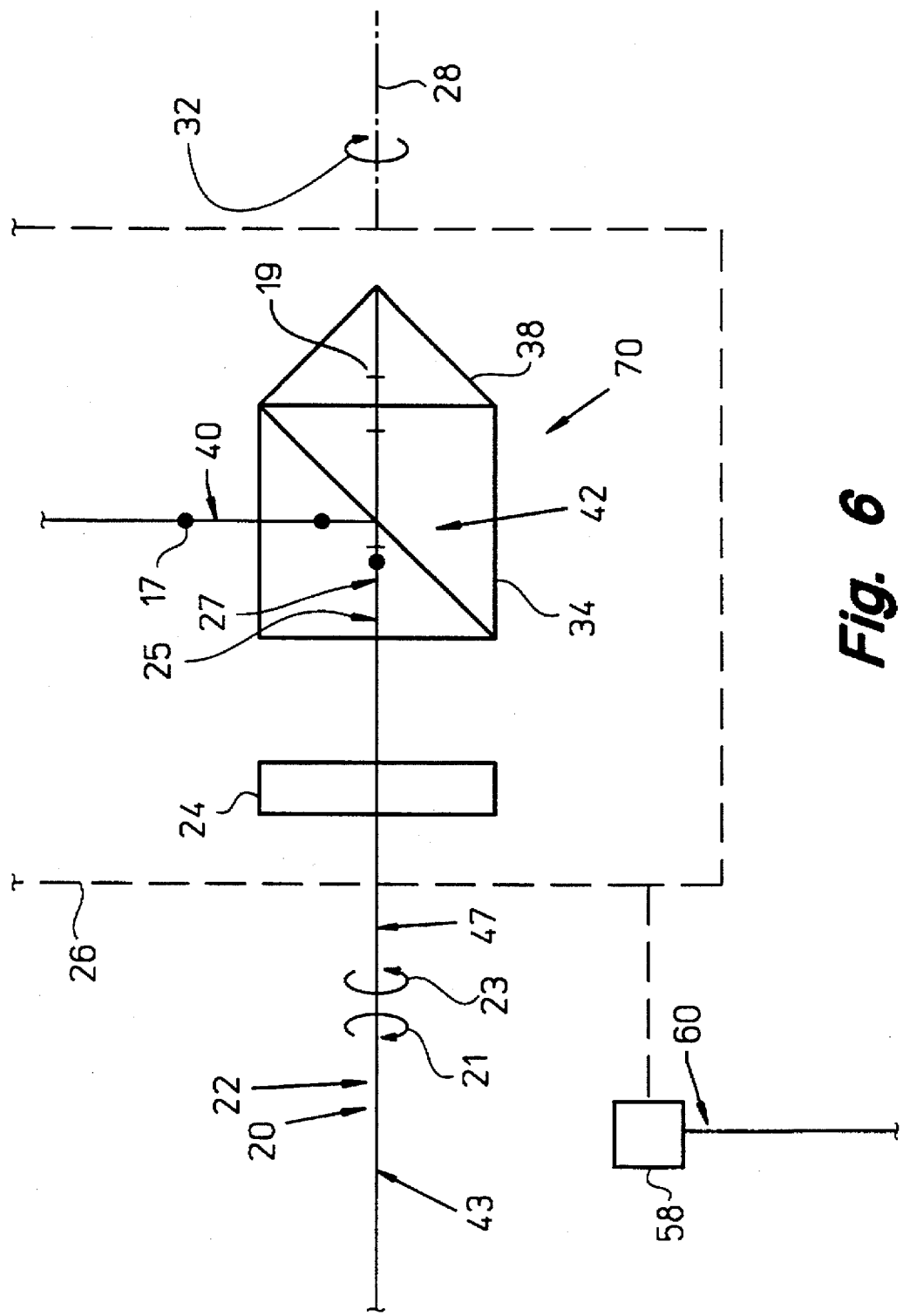
FIG. 6 is a partial view of still another embodiment wherein a quarter wave plate is mounted in the rotating reference frame separated from the interferometer.

In the embodiment shown in FIG. 5, the quarter wave plate 24 is affixed to the interferometer 70. FIG. 6 depicts a partial view of another embodiment wherein the quarter wave plate 24 is separated from the interferometer 70. The other elements (not shown) are the same as those in FIG. 5.

Figure 7:
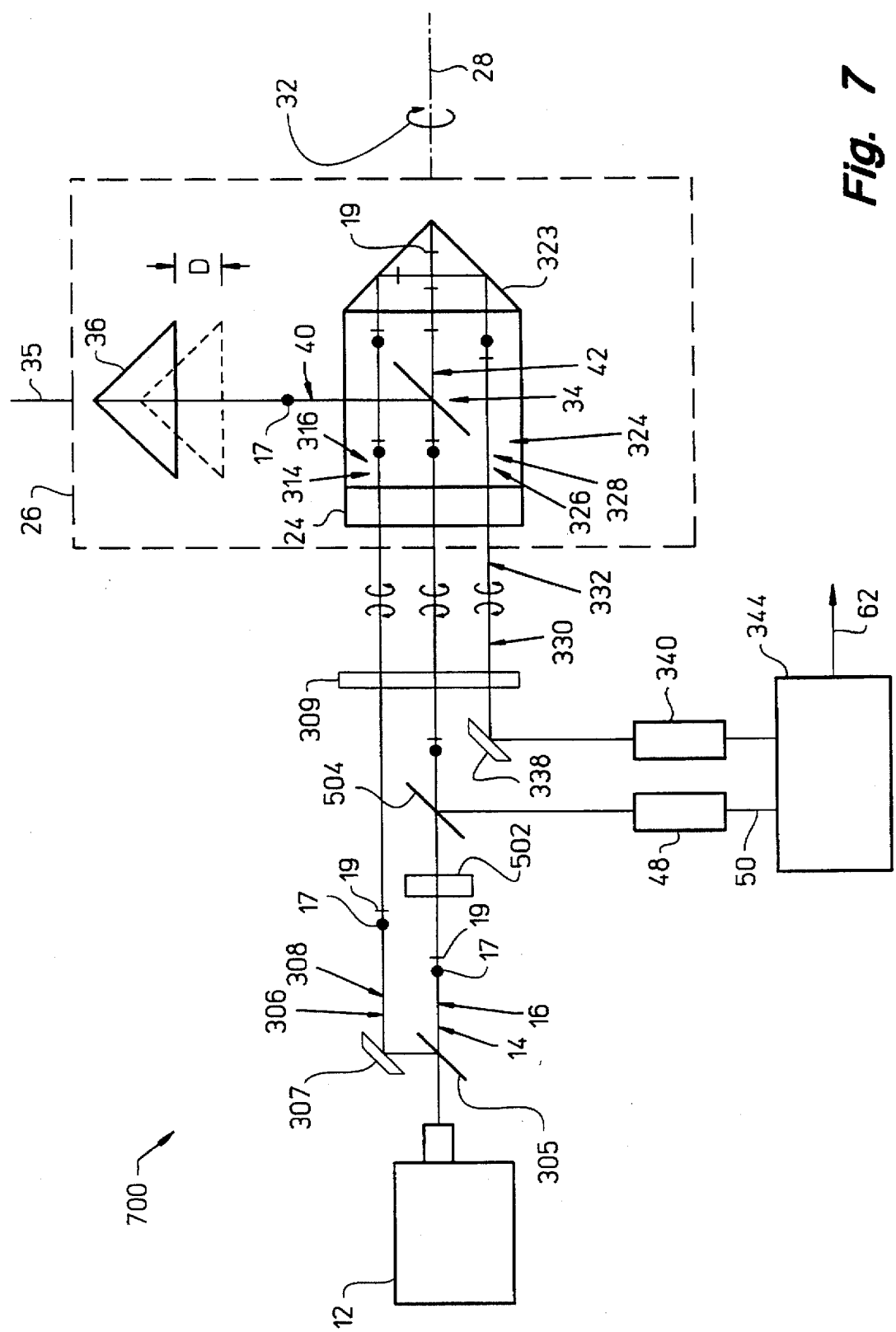
FIG. 7 is another embodiment of the present invention wherein the frequency shift due to the rotation of a quarter wave plate is corrected via the use of optical beams.

The apparatus 500 of FIG. 5 still requires use of the encoder 58. In FIG. 7, another alternate embodiment of the present invention is shown wherein an apparatus 700 uses an optical arrangement similar to that of FIG. 3 in order to eliminate the need for an encoder and the reference signal from the laser head 12. In FIG. 7, the elements having the same numerals as those in FIGS. 3 & 5 operate in like manner so that the apparatus 700 thereby generates the displacement signal 62.

It should be understood that the present invention requires the beams which enter and return from the rotating reference frame must be along paths that are parallel or coaxial to the rotation axis 28. After the beams pass through the quarter wave plate mounted in the rotating reference frame, the associated interferometer can be located in any suitable orientation, as long as the beams are directed to enter the interferometer properly. In other words, in the embodiments of FIGS. 1–7, the measurement and reference path reflectors are oriented on paths which are normal to the axis of rotation 28 and parallel (or coaxial) to the rotation axis, respectively. In the embodiments shown in FIGS. 4 & 6 where the quarter wave plate in the rotating reference frame is separated, the associated interferometer can be oriented differently so that the measurement and reference reflectors are not along paths respectively normal and parallel (or coaxial) to the rotation axis. Orienting the interferometer differently is useful for making other measurements in the rotating reference frame such as flatness or changes in angular position instead of just measuring radial displacement perpendicular to the rotation axis.

Although the above embodiments depict the reference reflector as being in a fixed location and in contact with the beam splitter, such limitation is not needed for the operation of the present invention. In other words, the present invention can be used in so called differential interferometers where the reference reflector is movable, and the interferometric measurement is a differential measurement made between the locations of the reference and the measurement reflectors.

Figure 8A:
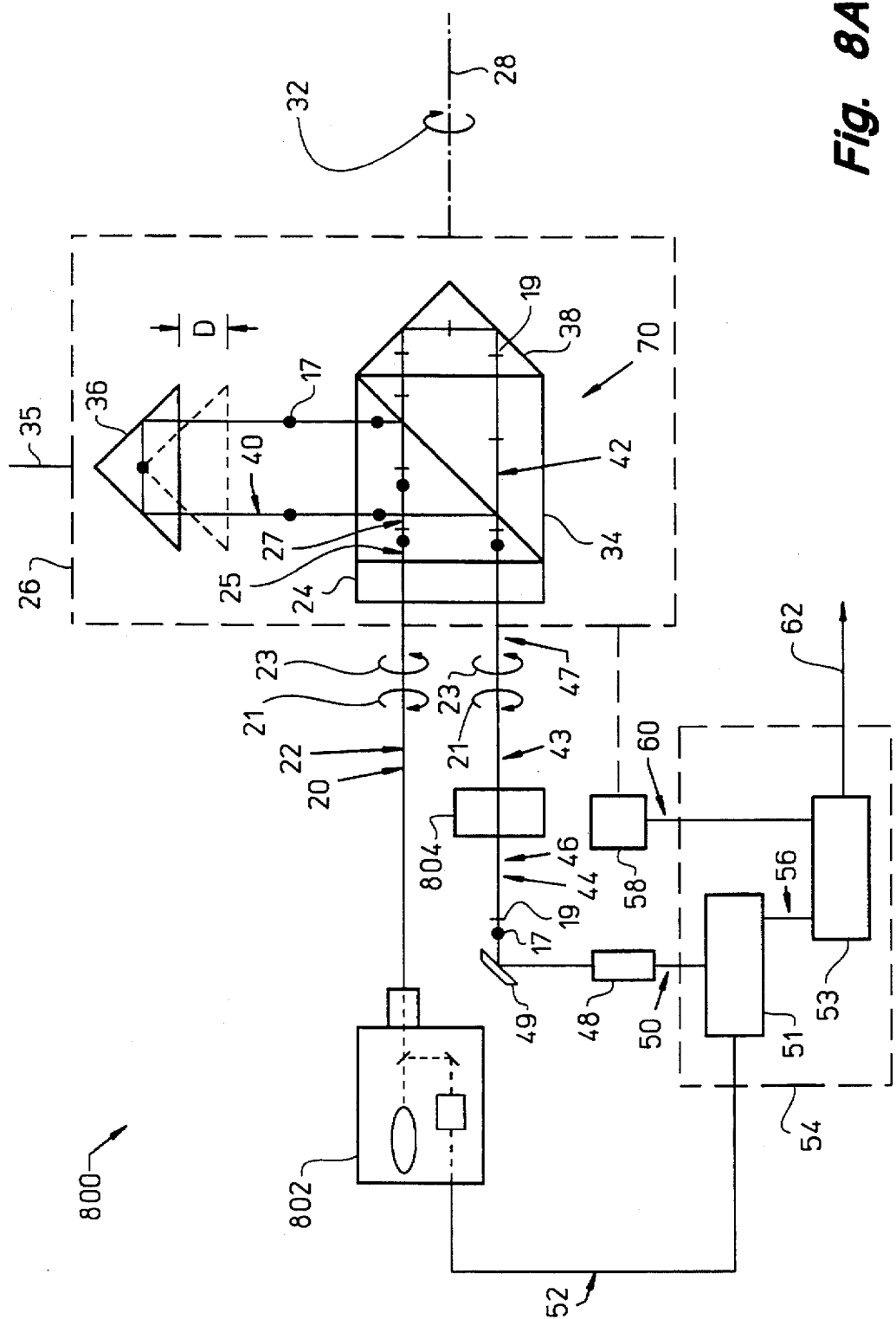
FIG. 8A is another embodiment of the present invention wherein the laser head generates twin beams having right and left circular polarizations with respect to one another.

The laser head used in the above described embodiments preferably generate twin beams which are linear and orthogonal to one another. In FIG. 8A, an apparatus 800 is shown wherein a laser head 802 generates the twin beams 20 & 22 having right and left circular polarizations with respect to one another. The beams 20 & 22 are transmitted into the rotating reference frame 26 along a path parallel to the rotation axis 28. With the exception of a quarter wave plate 804, the other elements are the same as those in FIG. 1 or FIG. 2. As should be clear, the quarter wave plate 804 is not the same as the quarter wave plate 24 of FIG. 1 because the quarter wave plate 804 is only needed to generate the beams 44 & 46.

Figure 8B:
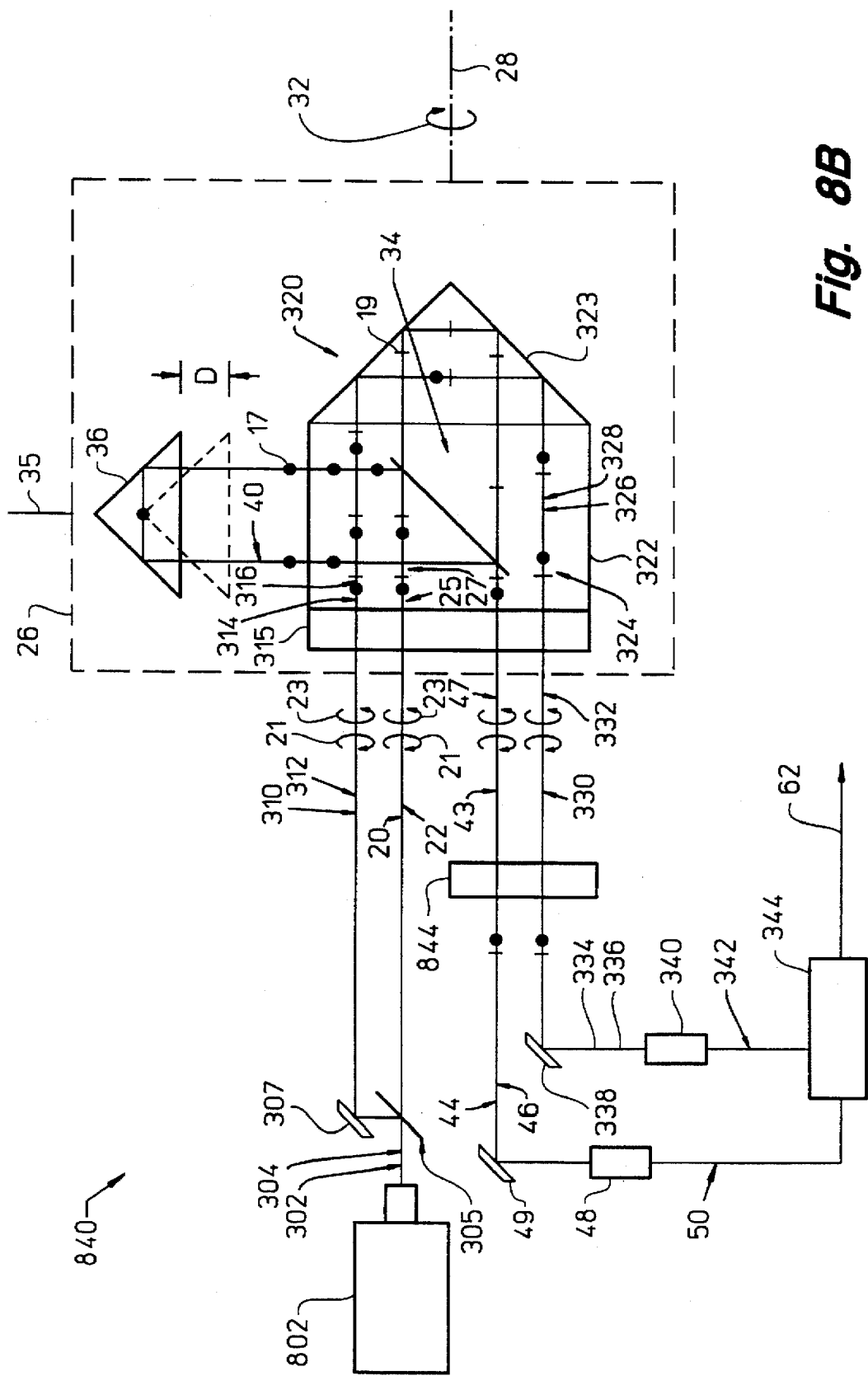
FIG. 8B is still another alternative embodiment wherein the laser head generates twin beams having right and left circular polarization states and the frequency shift due to the rotation of a quarter wave plate is corrected via the use of optical beams; where like reference numerals in each figure refer to common elements of the present invention.

In FIG. 8B, an apparatus 840 is shown wherein the laser head 802 is used for generating the beams 20, 22, 310, & 312, with each respective pair having right and left circular polarizations states with respect to one another. With exception of a quarter wave plate 844, the other elements are the same as those in FIGS. 3 or 4. The quarter wave plate 844 is only needed to generate the beams 44, 46, 334, & 336 and is thus not the same as the quarter wave plate 309 of FIG. 3.

While the present invention has been described and illustrated with reference to the specific embodiments, those skilled in the art will recognize that modifications and variations may be made without departing from the principles disclosed by the teachings of the present invention. For example, the stationary quarter wave plates of FIGS. 3, 4, 7, & 8B which are each preferably monolithic in construction, can be divided into two portions, on portion for generating the beams 310, 312, 20, & 22 and another portion for producing the beams 44, 46, 334, & 336. The two portions need not be stacked on top of one another so long as they are in position for receiving the corresponding beams. It is also possible for having individual portions sized for receiving individual beams or various subcombinations of beams.

The quarter wave plates mounted in the rotation reference frame 26 of FIGS. 3, 4, 7, & 8B which are each preferably of monolithic construction, can be divided into an annular portion for producing the beams 314, 316, 330, & 332 and a central core portion for generating the beams 25, 27, 43, & 47. The two portions can be concentric to one another but the central portion does not have to be nested within the annular portion.

Moreover, the receivers 48 & 340 of FIGS. 1–4, 7, 8A, & 8B can be located online to receive the beams 44 & 46 and 334 & 336, respectively. In other words, the beam benders 49 & 338 can eliminated if the size of the receivers are small enough so as not to interfere with the beams from the laser head or the parallel beam paths for the input and returning beams are separated with enough distance so that the receivers do not interfere with the input beams from laser head.

In the embodiments of FIGS. 5–6, flat mirrors can be used for the reflectors. The preferred devices are cube corner reflectors.

The isolator 502 of FIGS. 5–7, though preferred, is not always needed. Although its operation is not as efficient, the laser head can operate as a source of the twin beams without the use of an isolator even though some laser light is returned to it.

Finally, the twin beams from the laser head are preferably beams having optical light frequencies. However, other non-optical frequencies can be used since the operation of the AC type of interferometer is not restricted to the optical frequencies of light.

I claim:

1. An interferometric displacement measuring apparatus for measuring a change of position of an item which is located in a rotating reference frame, wherein the rotating reference frame is spinning about an axis of rotation with respect to a fixed frame of reference and accumulates a rotation angle over a time period, the apparatus comprising:

a source mounted in the fixed reference frame for emitting two beams of electromagnetic radiation having frequencies f1 and f2, respectively;

means for transmitting the two beams as first and second beams having right and left circular polarization states with respect to one another;

a first quarter wave plate mounted in the rotating reference frame for receiving the first and second beams from a path parallel to the rotation axis and for converting those beams to third and fourth beams;

an interferometer mounted in the rotating reference frame including a polarizing beam splitter, a reference path reflector, and a movable measurement path reflector coupled to the item; the first quarter wave plate having a fast axis which is aligned at a forty-five (45) degree angle with respect to a polarization axis of the beam splitter; the beam splitter operating to direct the third beam along a reference path of the interferometer and the fourth beam along a measurement path of the interferometer;

the reference path reflector disposed for receiving the third beam and returning it as a fifth beam towards the beam splitter;

the measurement path reflector disposed for receiving the fourth beam and returning it as an sixth beam towards the beam splitter;

the beam splitter operating to receive the fifth and sixth beams and directing them towards the first quarter wave plate; the first quarter wave plate operating for converting the applied fifth and sixth beams to respective seventh and eighth beams;

the seventh and eighth beams being transmitted out of the rotating reference frame into the fixed reference frame along a path parallel to the rotation axis;

a second quarter wave plate mounted in the fixed reference frame for receiving the seventh and eighth beams and for converting those beams respectively into ninth and tenth beams having linear and orthogonal polarization states with respect to one another;

a receiver aligned to the polarization states of and coupled for responding to the ninth and tenth beams for generating a measure signal including information representing a measurement of the difference between the f1 and f2 frequencies and information proportional to the change of position and the rotation angle; and a signal processor coupled for responding to the measure signal, a reference signal representing a measurement of the difference between the f1 and f2 frequencies, and a second signal representing a measurement of the rotation angle; the signal processor operating to produce a displacement signal representing the change of position.

2. The apparatus of claim 1 wherein the means for transmitting is in the source so that the source generates the two beams with right and left circular polarization states with respect to one another.

3. The apparatus of claim 1 wherein the source produces laser beams.

4. The apparatus of claim 3 wherein the two beams have optical light frequencies.

5. The apparatus of claim 1 wherein a rotary encoder is coupled to the rotating reference frame for generating the second signal.

6. The apparatus of claim 5 wherein the reference signal is generated by a second receiver coupled for receiving the two beams produced by the source.

7. The apparatus of claim 1 wherein the first quarter wave plate is affixed to the interferometer.

8. The apparatus of claim 7 wherein the two beams from the source have linear and orthogonal polarization states with respect to one another and the means for transmitting is a third quarter wave plate coupled to receive the two beams.

9. The apparatus of claim 7 wherein the reference signal is generated by a second receiver coupled for receiving the two beams produced by the source.

10. The apparatus of claim 3 wherein the first quarter wave plate is affixed to the interferometer.

11. The apparatus of claim 10 wherein a rotary encoder is coupled to the rotating reference frame for generating the second signal.

12. The apparatus of claim 11 wherein the reference signal is generated by a second receiver coupled for receiving the two beams produced by the source.

13. The apparatus of claim 12 wherein the first and second beams are coaxial with the seventh and eighth beams; and a means for dividing is mounted in the fixed reference frame for directing the ninth and tenth beams to the receiver.

14. The apparatus of claim 13 an isolator is disposed between the source and the means for dividing.

15. The apparatus of claim 14 wherein the reference path and measurement path reflectors are cube corners.

16. The apparatus of claim 13 wherein the reference path and measurement path reflectors are cube corners.

17. The apparatus of claim 1 wherein the reference path and measurement path reflectors are cube corners.

18. The apparatus of claim 1 wherein the first and second beams are coaxial with the seventh and eighth beams; and a means for dividing is mounted in the fixed reference frame for directing the ninth and tenth beams to the receiver.

19. The apparatus of claim 18 wherein an isolator is disposed between the source and the means for dividing.

20. The apparatus of claim 19 wherein the reference path and measurement path reflectors are cube corners.

21. The apparatus of claim 18 wherein the reference path and measurement path reflectors are cube corners.

22. The apparatus of claim 3 wherein the first and second beams are coaxial with the seventh and eighth beams; and a means for dividing is mounted in the fixed reference frame for directing the ninth and tenth beams to the receiver.

23. The apparatus of claim 22 wherein an optical isolator is connected between the source and the means for dividing.

24. The apparatus of claim 1 wherein a beam bender is disposed for redirecting the ninth and tenth beams from a path of initial travel to another path towards the receiver.

25. The apparatus of claim 1 wherein the ninth and tenth beams are transmitted from the second quarter wave plate along a path parallel to the rotation axis and the receiver is disposed on that path.

26. The apparatus of claim 1 wherein the two beams from the source have linear and orthogonal polarization states with respect to one another and the means for transmitting is a third quarter wave plate coupled to receive the two beams.

27. The apparatus of claim 1 wherein the means for transmitting is the second quarter wave plate and the source produces the two beams with linear and orthogonal polarization states with respect to one another.

28. The apparatus of claim 27 wherein the reference signal is generated by a second receiver coupled for receiving the two beams produced by the source.

29. The apparatus of claim 27 wherein a rotary encoder is coupled to the rotating reference frame for generating the second signal.

30. The apparatus of claim 29 wherein the reference signal is generated by a second receiver coupled for receiving the two beams produced by the source.

31. The apparatus of claim 27 wherein the first quarter wave plate is affixed to the interferometer.

32. The apparatus of claim 31 wherein the reference signal is generated by a second receiver coupled for receiving the two beams produced by the source.

33. The apparatus of claim 31 wherein a rotary encoder is coupled to the rotating reference frame for generating the second signal.

34. The apparatus of claim 33 wherein the reference signal is generated by a second receiver coupled for receiving the two beams produced by the source.

35. The apparatus of claim 33 wherein the source produces laser beams.

36. The apparatus of claim 35 wherein a beam bender is disposed for redirecting the ninth and tenth beams from a path of initial travel to another path towards the receiver.

37. The apparatus of claim 35 wherein the ninth and tenth beams are transmitted from the second quarter wave plate along a path parallel to the rotation axis and the receiver is disposed on that path.

38. The apparatus of claim 35 wherein the beams have optical light frequencies.

39. The apparatus of claim 35 wherein the first and second beams are coaxial with the seventh and eighth beams; and a means for dividing is mounted in the fixed reference frame for directing the ninth and tenth beams to the receiver.

40. The apparatus of claim 39 wherein an isolator is disposed between the source and the means for dividing.

41. The apparatus of claim 40 wherein the reference path and measurement path reflectors are cube corners.

42. The apparatus of claim 1 wherein the reference signal is generated by a second receiver coupled for receiving the two beams produced by the source.

43. The apparatus of claim 3 wherein the two beams from the source have linear and orthogonal polarization states with respect to one another and the means for transmitting is a third quarter wave plate coupled to receive the two beams.

44. The apparatus of claim 3 wherein the means for transmitting is the second quarter wave plate and the source produces the two beams with linear and orthogonal polarization states with respect to one another.

45. The apparatus of claim 10 wherein a rotary encoder is coupled to the rotating reference frame for generating the second signal.

46. The apparatus of claim 10 wherein the two beams from the source have linear and orthogonal polarization states with respect to one another and the means for transmitting is a third quarter wave plate coupled to receive the two beams.

47. The apparatus of claim 10 wherein the means for transmitting is the second quarter wave plate and the source produces the two beams with linear and orthogonal polarization states with respect to one another.

48. The apparatus of claim 47 wherein the reference signal is generated by a second receiver coupled for receiving the two beams produced by the source.

49. The apparatus of claim 48 wherein a beam bender is disposed for redirecting the ninth and tenth beams from a path of initial travel to another path towards the receiver.

50. The apparatus of claim 1 wherein the first quarter wave plate is mounted apart from the interferometer.

51. The apparatus of claim 50 wherein the means for transmitting is the second quarter wave plate and the source produces the two beams with linear and orthogonal polarization states with respect to one another.

52. An interferometric displacement measuring apparatus for measuring a change of position of an item which is located in a rotating reference frame, wherein the rotating reference frame is spinning about an axis of rotation with respect to a fixed frame of reference and accumulates a rotational angle over a time period, the apparatus comprising:

a source mounted in the fixed reference frame for emitting two beams of electromagnetic radiation having frequencies f1 and f2, respectively; wherein the two beams are produced having linear and orthogonal polarizations states with respect to one another;

a divider for splitting the two beams into two parallel sets of two beams with the beams of each set having the frequencies f1 and f2, respectively, and linear and orthogonal polarization states;

a first means for transmitting the two beams of one set as first and second beams having right and left circular polarization states with respect to one another;

a first quarter wave plate mounted in the rotating reference frame for receiving the first and second beams from a path parallel to the rotation axis and for converting those beams to third and fourth beams;

an interferometer mounted in the rotating reference frame including a polarizing beam splitter, a reference path reflector, and a movable measurement path reflector coupled to the item; the first quarter wave plate having a fast axis which is aligned at a forty-five (45) degree angle with respect to a polarization axis of the beam splitter; the beam splitter operating to direct the third beam along a reference path of the interferometer and the fourth beam along a measurement path of the interferometer;

the reference path reflector disposed for receiving the third beam and returning it as a fifth beam towards the beam splitter;

the measurement path reflector disposed for receiving the fourth beam and returning it as an sixth beam towards the beam splitter;

the beam splitter operating to receive the fifth and sixth beams and directing them towards the first quarter wave plate; the first quarter wave plate operating for converting the applied fifth and sixth beams to respective seventh and eighth beams;

the seventh and eighth beams being transmitted out of the rotating reference frame into the fixed reference frame along a path parallel to the rotation axis;

a second quarter wave plate mounted in the fixed reference frame for receiving the seventh and eighth beams and for converting those beams respectively into ninth and tenth beams having linear and orthogonal polarization states with respect to one another;

a first receiver aligned to the polarization states of and coupled for responding to the ninth and tenth beams for generating a measure signal including information representing a measurement of the difference between the f1 and f2 frequencies and information proportional to the change of position and the rotation angle;

a second means for transmitting being disposed for receiving the second set of beams and for operating to produce eleventh and twelfth beams having right and left circular polarization states with respect to one another;

a third quarter wave plate mounted in the rotating reference frame for receiving the eleventh and twelfth beams from a path parallel to the rotation axis and for converting them into thirteenth and fourteenth beams;

the interferometer further including a portion for receiving and operating to send the thirteenth and fourteenth beams to the reference path reflector; the reference path reflector operating to return those beams as fifteenth and sixteenth beams to the interferometer; the interferometer operating to transmit the fifteenth and sixteenth beams to the third quarter wave plate; the third quarter wave plate operating to convert those beams to seventeenth and eighteenth beams;

the seventeenth and eighteenth beams being transmitted out of the rotating reference frame into the fixed reference frame and being sent along a path parallel to the rotation axis;

a fourth quarter wave plate mounted in the fixed reference frame for receiving the seventeenth and eighteenth beams and for converting them into nineteenth and twentieth beams having linear and orthogonal polarization states with respect to one another;

a second receiver being aligned to the polarization states of and disposed for receiving the nineteenth and twentieth beams; the second receiver operating to generate a second receiver signal including information representing a measurement of the difference between the f1 and f2 frequencies and the rotation angle; and a signal processor for responding to the measure and second receiver signals and generating a displacement signal representing the change of position.

53. The apparatus of claim 52 wherein the first means for transmitting is the second quarter wave plate.

54. The apparatus of claim 53 wherein the second means for transmitting is the second quarter wave plate.

55. The apparatus of claim 52 wherein the second means for transmitting is the second quarter wave plate.

56. The apparatus of claim 55 wherein the two beams have optical light frequencies.

57. The apparatus of claim 52 wherein the first quarter wave plate is affixed to the interferometer.

58. The apparatus of claim 52 wherein the first and third quarter wave plates are formed as one unitary plate.

59. The apparatus of claim 58 wherein the second and fourth quarter wave plates are formed as one unitary plate.

60. The apparatus of claim 59 wherein the second means for transmitting is the second quarter wave plate.

61. The apparatus of claim 60 wherein the first quarter wave plate is affixed to the interferometer.

62. The apparatus of claim 61 wherein the source produces laser beams.

63. The apparatus of claim 62 wherein the two beams have optical light frequencies.

64. The apparatus of claim 62 wherein the first and second beams are coaxial with the seventh and eighth beams; and a means for dividing is mounted in the fixed reference frame for directing the ninth and tenth beams to the first receiver.

65. The apparatus of claim 64 wherein an isolator is disposed between the divider and the means for dividing.

66. The apparatus of claim 52 wherein the first and second beams are coaxial with the seventh and eighth beams for directing the ninth and tenth beams to the first receiver.

67. The apparatus of claim 66 wherein an isolator is disposed between the divider and the means for dividing.

68. The apparatus of claim 67 wherein the source produces laser beams.

69. A method for using an interferometric position measuring apparatus to measure a change in displacement of an item disposed in a rotating reference frame; wherein the rotating reference frame is spinning about an axis of rotation with respect to a fixed reference frame and accumulates a rotation angle over a time period; the method comprising the steps of:

emitting from a source mounted in the fixed reference frame two beams of electromagnetic radiation having frequencies f1 and f2 respectively;

transmitting the two beams as first and second beams having right and left circular polarization states with respect to one another;

applying the first and second beams along a path parallel to the rotation axis to a first quarter wave plate mounted in the rotating reference frame and converting them to third and fourth beams, wherein the first quarter wave plate has a fast axis;

sending the third and fourth beams to an interferometer being mounted in the rotating reference frame and comprising a polarizing beam splitter, a reference path reflector, and a measurement path reflector coupled to the item; the interferometer having a polarization axis;

orienting the fast axis of the first quarter wave plate at a forty-five (45) degree angle with respect to the polarization axis of the beam splitter;

transmitting the third and fourth beams to the beam splitter and dividing those beams so that the third beam is sent to the reference path reflector and the fourth beam is sent to the measurement path reflector;

coupling the reference path reflector for receiving the third beam and returning it as a fifth beam towards the beam splitter;

coupling the measurement path reflector for receiving the fourth beam and returning it as a sixth beam towards the beam splitter;

operating the beam splitter to receive the fifth and sixth beams and directing them towards the first quarter wave plate;

passing the fifth and sixth beams through the first quarter wave plate and converting them to seventh and eighth beams;

transmitting the seventh and eighth beams out of the rotating reference frame into the fixed reference frame along a path parallel to the rotation axis;

disposing a second quarter wave plate in the fixed reference frame for receiving the seventh and eighth beams and for converting them into ninth and tenth beams having linear and orthogonal polarization states with respect to one another;

aligning a receiver to the polarization of and responding to the ninth and tenth beams for generating a measure signal including information representing a measurement of the difference between the f1 and f2 frequencies and information proportional to the change in displacement and the rotation angle; and operating a signal processor to respond to the measure signal, a reference signal representing a measurement of the difference between the f1 and f2 frequencies, and a second signal representing a measurement of the rotation angle and generating a displacement signal representing the change in displacement.

70. The method of claim 69 including the step of emitting the two beams as laser beams.

71. The method of claim 70 including the step emitting the two beams with optical light frequencies.

72. The method of claim 69 further including the steps of coaxially transmitting the first and second beams with the seventh and eighth beams; and dividing a portion of the ninth and tenth beams for transmission to the receiver.

73. The method of claim 72 further including the step of isolating a portion of the ninth and tenth beams which is returned to the source.

74. The method of claim 69 including the step of affixing the first quarter wave plate to the interferometer.

75. The method of claim 74 including the steps of coupling a rotary encoder to the rotating reference frame for producing the second signal.

76. The method of claim 75 including the steps of coupling a second receiver to receive the two beams from the source and generating the reference signal.

77. The method of claim 76 including the step of emitting the two beams as laser beams.

78. The method of claim 77 including the step emitting the two beams with optical light frequencies.

79. The method of claim 76 further including the steps of coaxially transmitting the first and second beams with the seventh and eighth beams; and dividing a portion of the ninth and tenth beams for transmission to the receiver.

80. The method of claim 77 further including the step of isolating a portion of the ninth and tenth beams which is returned to the source.

81. The method of claim 69 including the steps of coupling a second receiver to receive the two beams from the source and generating the reference signal.

82. The method of claim 69 including the steps of coupling a rotary encoder to the rotating reference frame for producing the second signal.

83. The method of claim 82 including the steps of coupling a second receiver to receive the two beams from the source and generating the reference signal.

84. The method of claim 69 including the step of emitting the two beams from the source as beams having right and left circular polarization states with respect to one another.

85. A method for using an interferometric position measuring apparatus to measure a change in displacement of an item disposed in a rotating reference frame; wherein the rotating reference frame is spinning about an axis of rotation with respect to a fixed reference frame and accumulates a rotation angle over a time period; the method comprising the steps of:

emitting from a source mounted in the fixed reference frame two beams of electromagnetic radiation having frequencies f1 and f2 respectively, and linear and orthogonal polarization states with respect to one another;

splitting the two beams into two sets of two beams, with the beams of each set having the frequencies f1 and f2, respectively, and linear and orthogonal polarization states;

transmitting a first set of the two beams through a first quarter wave plate mounted in the fixed reference frame and converting those beams into first and second beams having right and left circular polarization states with respect to one another;

applying the first and second beams along a path parallel to the rotation axis to a second quarter wave plate mounted in the rotating reference frame and converting them to third and fourth beams, wherein the second quarter wave plate has a fast axis;

sending the third and fourth beams to an interferometer being mounted in the rotating reference frame and comprising a polarizing beam splitter, a reference path reflector, and a measurement path reflector coupled to the item; the interferometer having a polarization axis;

orienting the fast axis of the first quarter wave plate at a forty-five (45) degree angle with respect to the polarization axis of the beam splitter;

transmitting the third and fourth beams to the beam splitter and dividing those beams so that the third beam is sent to the reference path reflector and the fourth beam is sent to the measurement path reflector;

coupling the reference path reflector for receiving the third beam and returning it as a fifth beam towards the beam splitter;

coupling the measurement path reflector for receiving the fourth beam and returning it as a sixth beam towards the beam splitter;

operating the beam splitter to receive the fifth and sixth beams and directing them towards the second quarter wave plate;

passing the fifth and sixth beams through the second quarter wave plate and converting them to seventh and eighth beams;

transmitting the seventh and eighth beams out of the rotating reference frame into the fixed reference frame along a path parallel to the rotation axis;

sending the seventh and eighth beams to a third quarter wave plate disposed in the fixed reference frame and converting those beams into ninth and tenth beams having linear and orthogonal polarization states with respect to one another;

aligning a first receiver to the polarization of and responding to the ninth and tenth beams for generating a measure signal including information representing a measurement of the difference between the f1 and f2 frequencies and information proportional to the change of position and the rotation angle;

transmitting a second set of beams through a fourth quarter wave plate mounted in the fixed reference frame and converting those beams into eleventh and twelfth beams having right and left circular polarization states with respect to one another;

sending the eleventh and twelfth beams along the axis of rotation through a fourth quarter wave plate mounted in the rotating reference frame and converting them to thirteenth and fourteenth beams;

transmitting the thirteenth and fourteenth beams through a portion of the interferometer to the reference path reflector;

reflecting the thirteenth and fourteenth beams off the reference path reflector and returning those beams as fifteenth and sixteenth beams;

passing the fifteenth and sixteenth beams through the interferometer and through the third quarter wave plate and converting those beams into seventeenth and eighteenth beams;

transmitting the seventeenth and eighteenth beams out of the rotating reference frame into the fixed reference frame along a path parallel to the rotation axis;

passing the seventeenth and eighteenth beams through a fourth quarter wave plate mounted in the fixed reference frame and converting those beams into nineteenth and twentieth beams having linear and orthogonal polarization states with respect to one another;

aligning a second receiver to the polarization states of and responding to the nineteenth and twentieth beams for generating a second receiver signal including information representing a measurement of the difference between the f1 and f2 frequencies and the rotation angle; and applying the measure signal and the second receiver signal to a signal processor and generating a displacement signal representing the change in displacement.

86. The method of claim 85 including the step of emitting the two beams as laser beams.

87. The method of claim 86 including the step emitting the two beams with optical light frequencies.

88. The method of claim 85 further including the steps of coaxially transmitting the first and second beams with the seventh and eighth beams; and dividing a portion of the ninth and tenth beams for transmission to the receiver.

89. The method of claim 88 including the step of isolating a portion of the ninth and tenth beams which is returned to the source.

90. The method of claim 88 including the step of isolating a portion of the ninth and tenth beams from being returned to the source.

91. The method of claim 85 including the step of combining the second and fourth quarter wave plates as one unitary plate.

92. The method of claim 91 including the step of combining the first and third quarter wave plates as one unitary plate.

93. The method of claim 85 further including the step of affixing the second quarter wave plate to the interferometer.

94. The method of claim 93 including the step of emitting the two beams as laser beams.

95. The method of claim 94 including the step of emitting the two beams with optical light frequencies.

96. The method of claim 93 further including the steps of coaxially transmitting the first and second beams with the seventh and eighth beams; and dividing a portion of the ninth and tenth beams for transmission to the receiver.

97. The method of claim 96 including the step of isolating a portion of the ninth and tenth beams which is returned to the source.

98. The method of claim 85 including the step of combining the first and third quarter wave plates as one unitary plate.

* * * * *